US011445030B2

(12) United States Patent
Du (10) Patent No.: US 11,445,030 B2
(45) Date of Patent: Sep. 13, 2022

(54) SERVICE PROCESSING METHOD, DEVICE, AND SYSTEM

(71) Applicant: Advanced New Technologies Co., Ltd., Grand Cayman (KY)

(72) Inventor: Juan Du, Hangzhou (CN)

(73) Assignee: Advanced New Technologies Co., Ltd., Grand Cayman (KY)

( * ) Notice: Subject to any disclaimer, the term of this patent is extended or adjusted under 35 U.S.C. 154(b) by 95 days.

(21) Appl. No.: 16/137,306

(22) Filed: Sep. 20, 2018

(65) Prior Publication Data

US 2019/0028555 A1 Jan. 24, 2019

Related U.S. Application Data

(63) Continuation of application No. PCT/CN2017/076397, filed on Mar. 13, 2017.

(30) Foreign Application Priority Data

Mar. 24, 2016 (CN) .......................... 201610173747.6

(51) Int. Cl.
*H04L 67/1097* (2022.01)
*H04L 67/51* (2022.01)
(Continued)

(52) U.S. Cl.
CPC .......... *H04L 67/16* (2013.01); *H04L 67/1097* (2013.01); *H04L 67/32* (2013.01); *G06F 16/27* (2019.01); *G06F 16/278* (2019.01)

(58) Field of Classification Search
CPC ........ G06F 3/067; G06F 3/0641; G06F 16/13; G06F 16/278; G06F 16/2477; G06F 9/466; G06F 16/10; G06F 16/27
See application file for complete search history.

(56) References Cited

U.S. PATENT DOCUMENTS 8,751,598 B1 6/2014 Shankar
8,856,583 B1* 10/2014 Visser ................. G06F 11/2094
714/4.11
(Continued)

FOREIGN PATENT DOCUMENTS

CN 102035865 4/2011
CN 103716253 4/2014
(Continued)

OTHER PUBLICATIONS

Crosby et al., "BlockChain Technology: Beyond Bitcoin," Sutardja Center for Entrepreneurship & Technology Technical Report, Oct. 16, 2015, 35 pages.
(Continued)

*Primary Examiner* — Tom Y Chang
(74) *Attorney, Agent, or Firm* — Fish & Richardson P.C.

(57) ABSTRACT

A service processing device receives a service processing request for a service event sent by a service requesting device, where the service processing request comprises service processing reference information, and where the service processing reference information is used by the service processing device to determine a storage location of data related to a current service in a database. A particular storage location is determined based on the service processing reference information. An idempotent check is performed on the particular storage location. A method of processing is determined to perform on the current service based on a result of the idempotent check.

12 Claims, 6 Drawing Sheets

(51) Int. Cl.
*H04L 67/60* (2022.01)
*G06F 16/27* (2019.01)

(56) References Cited

U.S. PATENT DOCUMENTS

| | | | | |
|---|---|---|---|---|
| 8,914,429 | B2* | 12/2014 | Pitts | G06F 16/10 |
| | | | | 707/829 |
| 9,471,585 | B1* | 10/2016 | Theimer | G06F 3/0641 |
| 2002/0133601 | A1* | 9/2002 | Kennamer | H04L 67/1034 |
| | | | | 709/229 |
| 2006/0248308 | A1* | 11/2006 | Wang | G06F 11/2089 |
| | | | | 711/173 |
| 2009/0164621 | A1 | 6/2009 | Kothari et al. | |
| 2012/0209808 | A1* | 8/2012 | Tien | H04W 4/90 |
| | | | | 707/622 |
| 2013/0066949 | A1* | 3/2013 | Colrain | G06F 9/466 |
| | | | | 709/203 |
| 2013/0268509 | A1* | 10/2013 | O'Neill | G06F 16/278 |
| | | | | 707/713 |
| 2014/0195490 | A1 | 7/2014 | Leverett et al. | |
| 2014/0380323 | A1 | 12/2014 | Wolf et al. | |
| 2016/0042039 | A1* | 2/2016 | Kaufmann | G06F 16/2456 |
| | | | | 707/722 |

FOREIGN PATENT DOCUMENTS

| | | |
|---|---|---|
| CN | 103853764 | 6/2014 |
| CN | 104253702 | 12/2014 |
| JP | 2008511084 | 4/2008 |
| JP | 2009536403 | 10/2009 |
| JP | 2010157202 | 7/2010 |
| JP | 2014529141 | 10/2014 |
| JP | 2017538762 | 12/2017 |
| WO | WO 2017042890 | 3/2017 |

OTHER PUBLICATIONS

Nakamoto, "Bitcoin: A Peer-to-Peer Electronic Cash System," www.bitcoin.org, 2005, 9 pages.
European Extended Search Report in European Patent Application No. 17769333.0, dated Oct. 1, 2019, 9 pages.
PCT International Preliminary Report on Patentability in International Application No. PCT/CN2017/076397, dated Sep. 25, 2018, 9 pages (with English translation).
International Search Report by the International Searching Authority issued in International Application No. PCT/CN2017/076397 dated Jun. 5, 2017; 9 pages.

\* cited by examiner

SERVICE PROCESSING METHOD, DEVICE, AND SYSTEM

CROSS-REFERENCE TO RELATED APPLICATIONS

This application is a continuation of PCT Application No. PCT/CN2017/076397, filed on Mar. 13, 2017, which claims priority to Chinese Patent Application No. 201610173747.6, filed on Mar. 24, 2016, and each application is hereby incorporated by reference in its entirety.

TECHNICAL FIELD

The present application relates to the field of computer application technologies, and in particular, to a service processing method, device, and system.

BACKGROUND

In the computer system, idempotent operations performed a plurality of times exert the same impact as an idempotent operation performed once. In actual applications, the idempotent operation is usually performed to avoid impact of repeated operations on the system. The financial system is used as an example. It must be ensured that a transfer request corresponds to one transfer operation, and a plurality of transfer operations caused by the network delay are not allowed. Therefore, idempotence of an external accounting interface needs to be implemented in the financial system.

To accomplish idempotency, the common practice is to impose the unique constraint on each service request in a database on the service system side. For example, an idempotent table is created in the database. Each time before the service request is processed, unique identification information (such as "service request transaction number", "service request transaction number"+"service type", or "service request transaction number"+"service request source") of the service request needs to be inserted to the idempotent table. If the identification information is successfully inserted, it indicates that the service system processes the service request for the first time. If the identification information fails to be inserted, it indicates that the service information already exists in the idempotent table, that is, the service system has previously processed the service request. In this case, the request can be directly determined as a repeated request, and the request stops to be processed.

Generally, the previously described solution can be used to better accomplish idempotence of the external interface in the service system. However, due to a distributed storage requirement or a disaster recovery requirement, data is more often stored through partition or sharding. In the partition application scenario or the sharding application scenario, a request side initiates a plurality of requests to the service system for the same service, but for some reasons (such as disaster recovery switchover), the plurality of requests are routed to different data tables by the service system. Because idempotent tables of the different data tables are different, an idempotent failure may occur, leading to repeated service processing.

SUMMARY

For the previous technical problems, the present application provides a service processing method, device, and system to ease an idempotent failure problem in the database sharding application scenario or the multi-database application scenario. The technical solutions are as follows:

According to a first aspect of the present application, a service processing method is provided, and the method includes the following: generating, by a service request side, a service processing request that includes service processing reference information, and sending the service processing request to a service processing side, where the service processing reference information is used by the service processing side to determine a storage location of related data of a current service in a database, and service processing requests sent repeatedly for the same service event include the same service processing reference information; and determining, by the service processing side, a corresponding storage location based on the service processing reference information included in the request after receiving the service processing request, performing an idempotent check on the determined storage location, and performing processing on the current service based on a result of the idempotent check.

According to a second aspect of the present application, a service processing method is provided, and the method is applied to a service request side and includes the following: generating a service processing request that includes service processing reference information; and sending the service processing request to a service processing side, so that the service processing side determines a corresponding storage location based on the service processing reference information included in the request after receiving the service processing request, performs an idempotent check on the determined storage location, and performs processing on a current service based on a result of the idempotent check.

The service processing reference information is used by the service processing side to determine a storage location of related data of the current service in a database, and service processing requests sent repeatedly for the same service event include the same service processing reference information.

According to a third aspect of the present application, a service processing method is provided, and the method is applied to a service processing side and includes the following: receiving a service processing request sent by a service request side, where the service processing request includes service processing reference information; and determining a corresponding storage location based on the service processing reference information included in the request, performing an idempotent check on the determined storage location, and performing processing on a current service based on a result of the idempotent check.

The service processing reference information is used by the service processing side to determine a storage location of related data of the current service in a database, and service processing requests sent repeatedly by the service request side for the same service event include the same service processing reference information.

According to a fourth aspect of the present application, a service processing device is provided, and the device is applied to a service request side and includes the following: a request generating module, configured to generate a service processing request that includes service processing reference information; and a request sending module, configured to send the service processing request to a service processing side, so that the service processing side determines a corresponding storage location based on the service processing reference information included in the request after receiving the service processing request, performs an idempotent check on the determined storage location, and performs processing on a current service based on a result of the idempotent check.

The service processing reference information is used by the service processing side to determine a storage location of related data of the current service in a database, and service processing requests sent repeatedly for the same service event include the same service processing reference information.

According to a fifth aspect of the present application, a service processing device is provided, and the device is applied to a service processing side and includes the following: a request receiving module, configured to receive a service processing request sent by a service request side, where the service processing request includes service processing reference information; and a service processing module, configured to determine a corresponding storage location based on the service processing reference information included in the request, perform an idempotent check on the determined storage location, and perform processing on a current service based on a result of the idempotent check.

The service processing reference information is used by the service processing side to determine a storage location of related data of the current service in a database, and service processing requests sent repeatedly by the service request side for the same service event include the same service processing reference information.

According to a sixth aspect of the present application, a service processing system is provided, and the system includes a service request side device and a service processing side device.

The service request side device includes the following: a request generating module, configured to generate a service processing request that includes service processing reference information; and a request sending module, configured to send the service processing request to a service processing side.

The service processing reference information is used by the service processing side to determine a storage location of related data of a current service in a database, and service processing requests sent repeatedly for the same service event include the same service processing reference information.

The service processing side device includes the following: a request receiving module, configured to receive the service processing request sent by the service request side; and a service processing module, configured to determine a corresponding storage location based on the service processing reference information included in the request, perform an idempotent check on the determined storage location, and perform processing on the current service based on a result of the idempotent check.

In the technical solutions provided in the present application, the service processing reference information is added to the service processing request sent by the service request side to the service processing side. Because the service processing requests sent repeatedly for the same service event include the same service processing reference information, a plurality of idempotent checks are not performed in different storage locations for the same service event, thereby effectively alleviating repeated service processing.

It should be understood that the previous general description and the following detailed description are merely an example for explanation, and do not limit the present application.

BRIEF DESCRIPTION OF DRAWINGS

To describe the technical solutions in the implementations of the present application or in the existing technology more clearly, the following briefly introduces the accompanying drawings needed for describing the implementations or the existing technology. Apparently, the accompanying drawings in the following description merely show some implementations recorded in the present application, and a person of ordinary skill in the art can still derive other drawings from these accompanying drawings without creative efforts.

DESCRIPTION OF IMPLEMENTATIONS

In big data application scenarios, data is usually stored through sharding to implement distributed data storage, and the sharding can be implemented based on a plurality of dimensions. A common division dimension is the "time" dimension. For example, 12 partitioned tables are obtained through division based on 12 months of one year, and the 12 partitioned tables are used to store service data corresponding to service requests initiated at different time.

In addition, redundant backup is usually performed on a database to implement system disaster recovery. That is, data in a master database is fully copied to a failover (FO) database. The master database and the FO database are usually deployed in different areas. A service request in the normal state is routed to the master database (normal mode), and a service request in the disaster recovery state is routed to the FO database (failover mode).

Both sharding and partition are common database application solutions. However, in the sharding application scenario and the partition application scenario, the existing idempotence solution may fail, and examples of the scenarios are as follows:

Assume that user A wants to transfer $100 to user B. A transfer platform on a service processing side receives, on November 30 at 23:59, a transfer request sent by user A by using an application platform, and routes the service to partitioned table 11 (a partitioned table corresponding to November). Because identification information of the service can be successfully inserted to an idempotent table of partitioned table 11, the service can be normally processed as: $100 is transferred from account A to account B. However, due to a network problem, the application platform on the service request side does not receive a response indicating that the service has been successfully processed, and therefore the application platform determines that a processing timeout occurs and sends a second transfer request to the transfer platform. The transfer platform receives the second transfer request on December 1 at 00:01, and routes the service to partitioned table 12 (a partitioned table corresponding to December). Because an idempotent table of partitioned table 12 does not include the identification information of the transfer service, the identification information can also be successfully inserted and the service can be normally processed. As a result, user A transfers $100 to user B again.

Assume that user A wants to transfer $100 to user B. The system is in the normal running state when a transfer platform on a service processing side receives a transfer request sent by user A by using an application platform for the first time, and the service is routed to a data table in a master database. In this case, identification information of the service can be successfully inserted to an idempotent table in the master database, and the service is normally processed as: $100 is transferred from account A to account B. Due to a network problem, the application platform on the service request side does not receive a response indicating that the service has been successfully processed, and therefore the application platform determines that a processing timeout occurs and sends a second transfer request to the transfer platform. When the transfer platform receives the second transfer request, the master database is faulty. Therefore, the service is routed to a data table in an FO database, and an idempotent table in the FO database does not include the identification information of the transfer service. Similarly, the identification information can also be successfully inserted and the service can be normally processed. As a result, user A transfers $100 to user B again.

It can be seen that in the data sharding application scenario or the multi-database storage application scenario, different storage locations (for example, a master database/FO database, a partitioned database, and a partitioned table) separately maintain respective idempotent tables. Therefore, an idempotent check fails when requests sent repeatedly for the same service event are routed to different storage locations.

Figure 1:
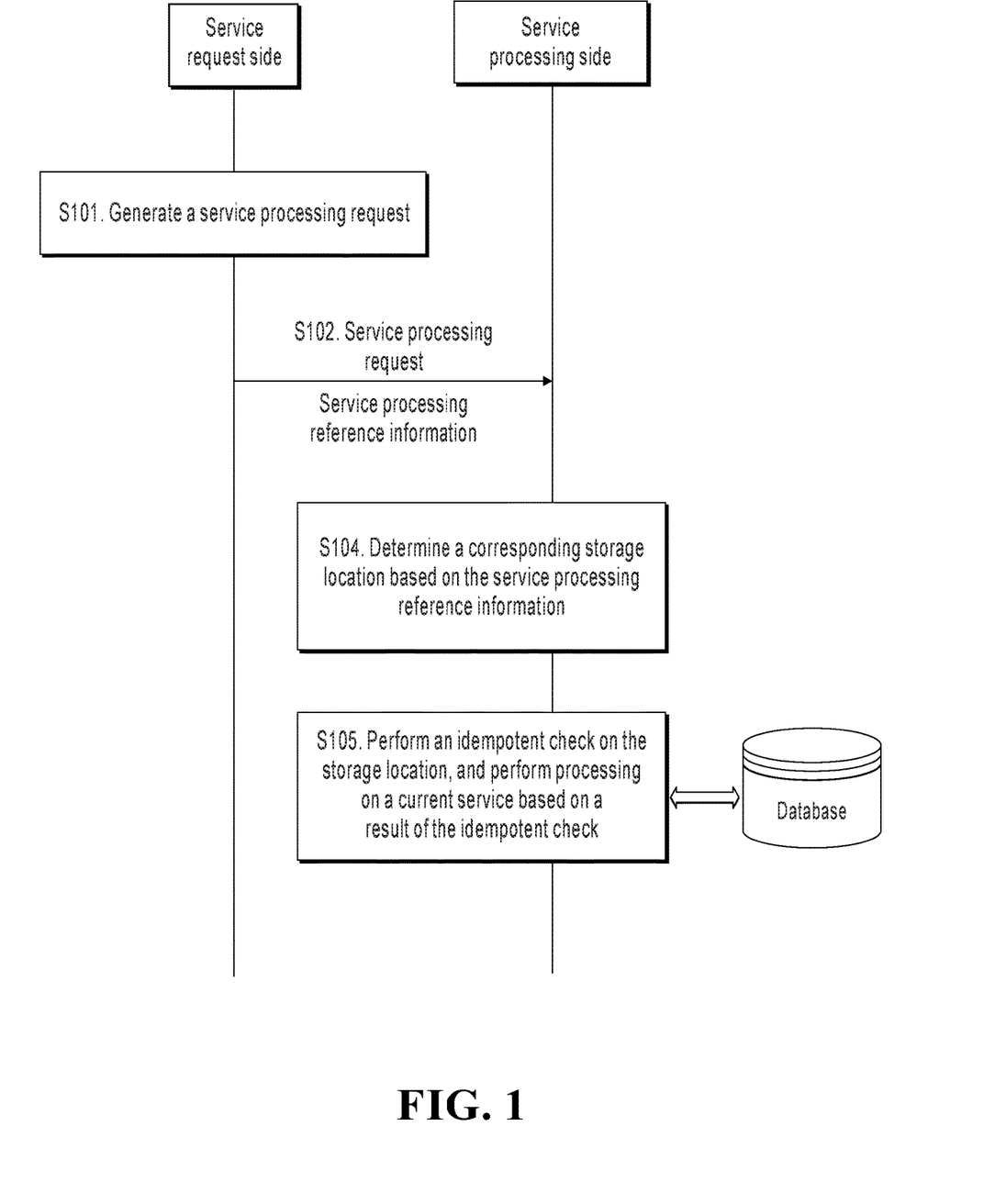
FIG. 1 is a schematic flowchart illustrating a service processing method, according to the present application.

The present application provides a service processing method to alleviate the previous problem. As shown in FIG. 1, the method can include the following steps.

S101. A service request side generates a service processing request that includes service processing reference information.

In comparison with the existing solution, an extended parameter such as service processing reference information is added to the service processing request in the solution of the present application. A function of the information is that in the sharding application scenario or the partition application scenario, a service processing side can determine a database storage location of a current service based on the information. That is, a database (including a master database/FO database, a partitioned database, etc.) and/or a data table in which a related data processing operation needs to be performed during current service processing are/is determined, so that the service processing side performs subsequent data processing in the determined storage location.

In the solution of the present application, the service request side does not need to learn of actual sharding logic or actual partition logic of the service processing side, provided that the service processing reference information provided by the service request side can be identified by the service processing side, and a database or a data table to be used by the current service can be determined based on the information.

For example, when partition is performed in the database based on the "time" dimension, the service request side only needs to obtain current time information before sending the service processing request, and write the time information to the service processing request. Further, the service processing side can select a corresponding time dimension data partitioned table based on the time information to perform subsequent processing.

In the database redundancy backup scenario, before sending the service processing request, the service request side learns of the database running mode information currently used by the service processing side, and then writes the database running mode information to the service processing request. The running mode described here includes a normal mode and a failover mode. Further, the service processing side can select a master database or an FO database based on the database running mode information to perform subsequent processing. In actual applications, the service request side can obtain, through subscription, the database running mode information actively pushed by the service request side or a middleware, or can obtain the database running mode information as needed when the service processing request needs to be sent. Implementations are not limited in the present application.

It is worthwhile to note that the previous two types of "service processing reference information" are merely used as examples, and are not intended to be construed as limitations on the solution of the present application. For example, when the service request side learns of the sharding logic or the partition logic of the service processing side, the service request side can directly add an identifier of the database or the data table used by the current service to the service request. It can be further understood that, based on an actual application requirement, one service processing request can include a plurality of types of service processing reference information. For example, both the time information and the database running mode information are included, so that requirements of a partition scenario application based on the time dimension and a failover scenario application can be met.

S102. The service request side sends the service processing request to a service processing side.

In the solution of the present application, another function of the service processing reference information is to ensure idempotence of an interface of the service processing side in the sharding/partition application scenario. Service processing requests sent repeatedly by the service request side for the same service event need to include the same service processing reference information, so that when processing a plurality of requests for the same service event, the service processing side can perform idempotent checks on the same storage location to reduce an idempotent check failure.

In actual applications, when sending the service processing request for the first time, the service request side can obtain the service processing reference information (such as current time information and current database running mode information), write the information to the service processing request, and store the written service processing reference information by using the service event as an identifier. Subsequently, if a processing request needs to be sent again for the same service event, the previously stored service processing reference information is directly read and is written to a new service processing request. Certainly, in the solution of the present application, the same service processing reference information needs to be included in the service processing requests sent repeatedly for the same service event. Therefore, the previously described method is not intended to be construed as a limitation on the solution of the present application. For example, the service request side can directly store all or a part of the service processing request generated for the first time (including at least the service processing reference information used for the first time). When the service processing request needs to be retransmitted, retransmission can be implemented by reading the previously stored content, and it is ensured that the service processing reference information included in the plurality of requests is the same.

S103. The service processing side determines a corresponding storage location based on the service processing reference information included in the request after receiving the service processing request.

In the solution of the present application, the service processing side needs to determine, based on the service processing reference information provided by the service request side, a database (including a master database/FO database, a partitioned database, etc.) and/or a data table in which a related data processing operation needs to be performed during current service processing.

For example, if the service processing request includes the time information, the service processing side can determine the corresponding time dimension data partitioned table based on the time information. If the service processing request includes the database running mode information, the service processing side can determine whether the master database or the FO database is used based on the information.

It should be understood that in actual applications, the service processing reference information can be only a part of information for determining a storage location. For example, in a two-dimensional partition solution based on "user number" and "time", a data partitioned table needs to be determined based on "number of a user initiating the current request (the information belongs to information included in the service request in default")" and "time information". After the master database or the FO database is determined, the data partitioned table further needs to be determined based on the partition solution. Certainly, "other information" is information that can be normally obtained by using the existing solution, and the existing technology can also be used to determine the storage location based on the other information. Implementations of the solution of the present application are not affected.

S104. Perform an idempotent check on the determined storage location, and perform processing on a current service based on a result of the idempotent check.

When a storage location of service related data in the database is determined, the idempotent check in the solution of the present application can be performed by using the existing technology. That is, each time before the service request is processed, unique identification information of the service request (for example, "service request transaction number", "service request transaction number+service type", or "service request transaction number+service request source") is inserted to an idempotent table corresponding to the current storage location. If the identification information is successfully inserted, it indicates that the service system processes the service request for the first time, and continues the normal service processing procedure. If the identification information fails to be inserted, it indicates that the service information already exists in the idempotent table, that is, the service system has previously processed the service request. In this case, the request can be directly determined as a repeated request, and the request stops to be processed. Certainly, the present application does not need to limit an idempotent check solution.

The following describes the solution of the present application with reference to an application scenario.

Figure 2:
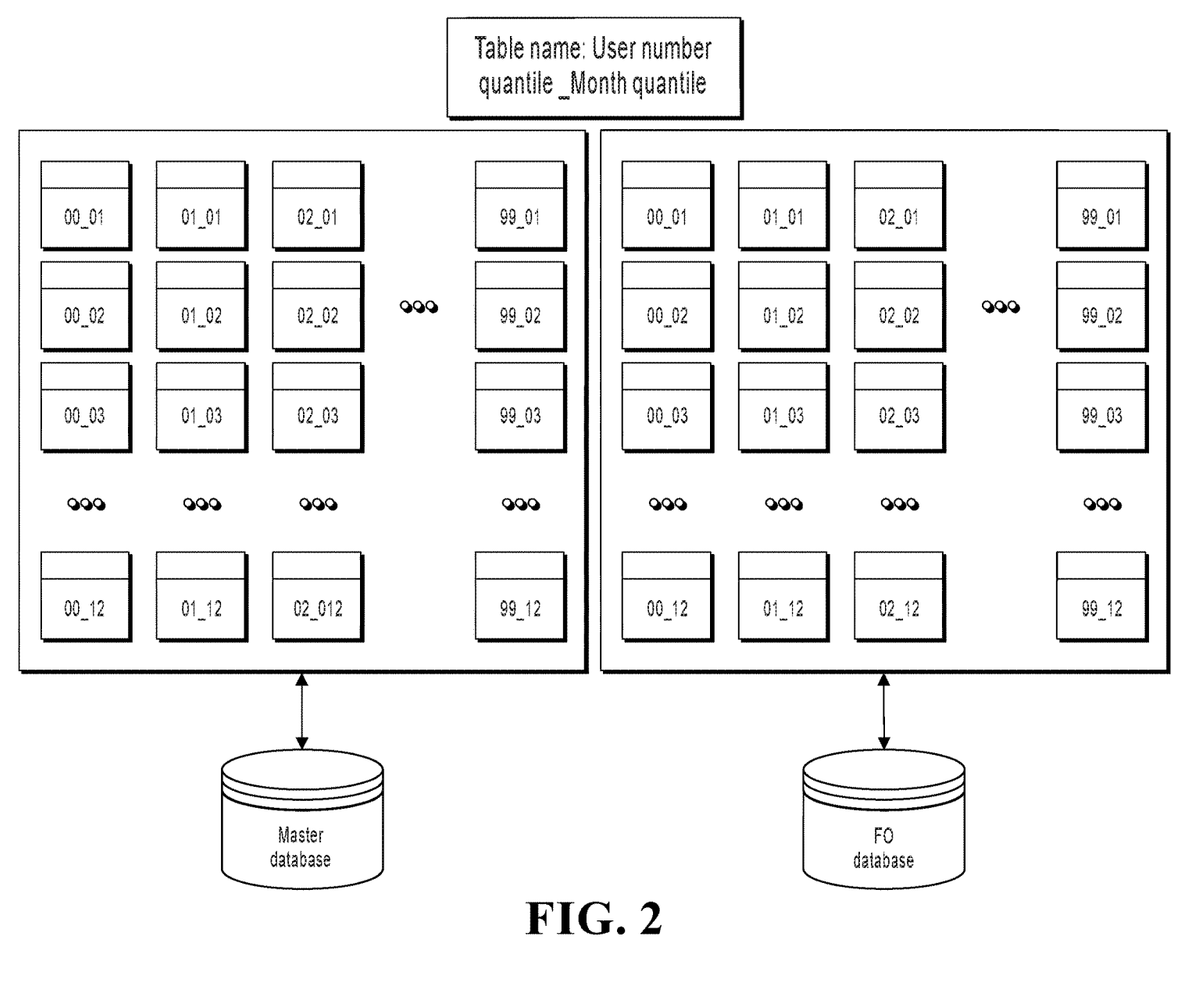
FIG. 2 is a schematic diagram illustrating a database deployment solution, according to the present application.

FIG. 2 shows deployment of a service database used on a transfer platform side in a financial system, and the data partitioned table is based on two dimensions:

In the "user number" dimension, two digits of a user number are taken to obtain 100 user quantiles: 00 to 99.

In the "time" dimension, 12 quantiles are obtained based on 12 months of one year.

Based on the previous two dimensions, a total of 1200 partitioned tables of 12×100 are formed. A naming rule of each partitioned table is "user number quantile_month quantile", and each partitioned table corresponds to one idempotent table.

In addition, to implement system disaster recovery, data in the master database is fully backed up to the FO database, and the FO database has the same structure as the master database. A service request in the normal state is routed to the master database (normal mode), and a service request in the disaster recovery state is routed to the FO database (failover mode).

If user A (whose user number is 100002) wants to transfer $100 to user B, user A initiates a transfer request to a transfer platform by using an application platform. When the application platform initiates the transfer request for the first time on Nov. 30, 2015 at 23:59, and the database is in a normal running mode in this case, the application platform writes "2015-11-30 23:59" and "normal mode" to the transfer request.

After receiving the transfer request, the transfer platform first determines, based on information included in the request, that a storage location is a master database 02_11 table, and then inserts a transaction number of the transfer service to an idempotent table of the master database 02_11 table. Because of the successful insertion, the service can be normally processed as: $100 is transferred from account A to account B.

Scenario 1: Because of a network problem, if the application platform does not receive a response indicating that the service has been successfully processed, the application platform determines that a processing timeout occurs and sends a second transfer request to the transfer platform. The second transfer request is initiated on Dec. 1, 2015 at 00:01. However, storage location information included in the second transfer request is still "2015-11-30 23:59" and "normal mode".

After receiving the second transfer request, the transfer platform determines, based on the information included in the request, that the storage location is the master database 02_11 table, and then inserts the transaction number of the transfer service to the idempotent table of the master database 02_11 table. Because the same record already exists in the idempotent table, the insertion fails, and the current transfer request stops to be processed to alleviate repeated transfer processing.

Scenario 2: Because of a network problem, if the application platform does not receive a response indicating that the service has been successfully processed, the application platform determines that a processing timeout occurs and sends a second transfer request to the transfer platform. The second transfer request is initiated on Dec. 1, 2015 at 00:01. In addition, the database on the transfer system side has been switched to the failover mode. However, information included in the second transfer request is still "2015-11-30 23:59" and "normal mode".

After receiving the second transfer request, the transfer platform determines, based on the information included in the request, that the storage location is the master database 02_11 table, and then inserts a transaction number of the transfer service to the idempotent table of the master database 02_11 table. Because the master database is faulty and cannot be accessed, the current transfer request cannot be processed. As a result, repeated transfer processing is also alleviated.

It can be understood that the application instances of the previous financial system are merely used as examples, and do not constitute a limitation on application scenarios of the solution of the present application. Actually, the solution of the present application can be applied to accomplish idempotence of the system interface in application scenarios in which the system database involves data sharding or multi-database storage, and different storage locations (such as a master database/FO database, a partitioned database, and a partitioned table) separately maintain respective idempotent tables. In the solution of the present application, because the service processing requests sent repeatedly by the service request side for the same service event include the same service processing reference information, a plurality of idempotent checks are not performed in different storage locations for the same service event, thereby effectively alleviating repeated service processing.

Figure 3:
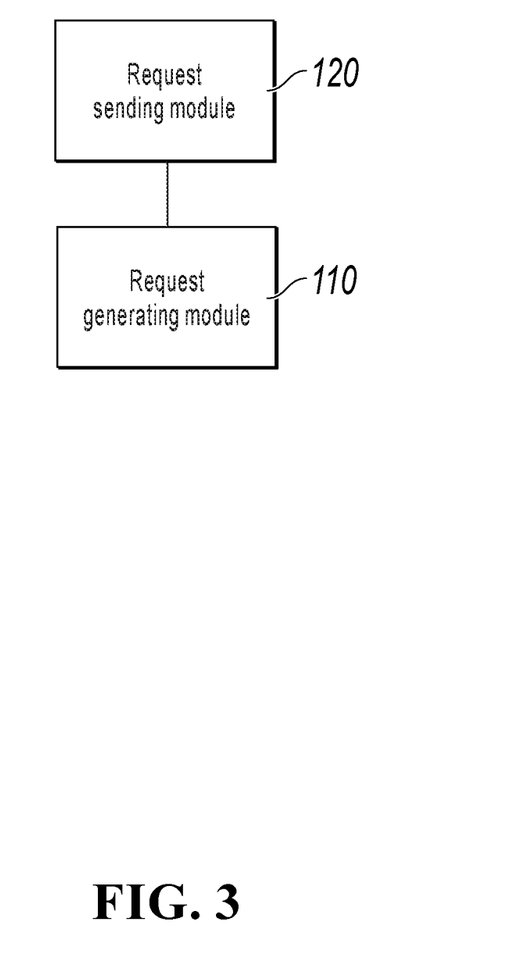
FIG. 3 is a schematic diagram illustrating a service request side device, according to the present application.

Corresponding to the previous method implementation, the present application further provides a service processing device applied to a service request side. Referring to FIG. 3, the device can include the following: a request generating module 110, configured to generate a service processing request that includes service processing reference information; and a request sending module 120, configured to send the service processing request to a service processing side, so that the service processing side determines a corresponding storage location based on the service processing reference information included in the request after receiving the service processing request, performs an idempotent check on the determined storage location, and performs processing on a current service based on a result of the idempotent check.

The service processing reference information is used by the service processing side to determine a storage location of related data of the current service in a database, and service processing requests sent repeatedly for the same service event include the same service processing reference information.

In an implementation of the present application, the service processing reference information can be time information.

The request generating module 110 can be configured to obtain current time information if the service processing request is sent for the first time for the same service event, and write the time information to the service processing request. Each subsequent request that is resent for the service event includes the time information.

In another implementation of the present application, the service processing reference information can be database running mode information, and the database mode can include a normal mode and a failover mode.

The request generating module 110 can be configured to obtain database running mode information currently used by the service processing side if the service processing request is sent for the first time for the same service event, and write the database running mode information to the service processing request. Each subsequent request that is resent for the service event includes the database running mode information.

Figure 4:
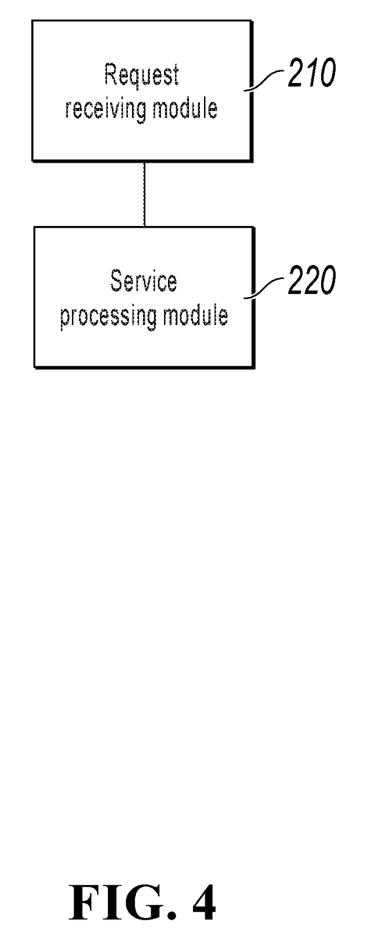
FIG. 4 is a schematic diagram illustrating a service processing side device, according to the present application.

Referring to FIG. 4, the present application further provides a service processing device applied to a service processing side, and the device can include the following: a request receiving module 210, configured to receive a service processing request sent by a service request side, where the service processing request includes service processing reference information; and a service processing module 220, configured to determine a corresponding storage location based on the service processing reference information included in the request, perform an idempotent check on the determined storage location, and perform processing on a current service based on a result of the idempotent check.

The service processing reference information is used by the service processing side to determine a storage location of related data of the current service in a database, and service processing requests sent repeatedly by the service request side for the same service event include the same service processing reference information.

In an implementation of the present application, the service processing reference information can be time information.

The service processing module 220 can be configured to determine a time dimension data partitioned table corresponding to the time information based on the time information included in the request, perform an idempotent check on the determined data partitioned table, and perform processing on the current service based on a result of the idempotent check.

In another implementation of the present application, the service processing reference information can be database running mode information, and the database mode can include a normal mode and a failover mode.

The service processing module 220 can be configured to determine a database corresponding to the database running mode information based on the database running mode information included in the request, perform an idempotent check on the determined database, and perform processing on the current service based on a result of the idempotent check.

Figure 5:
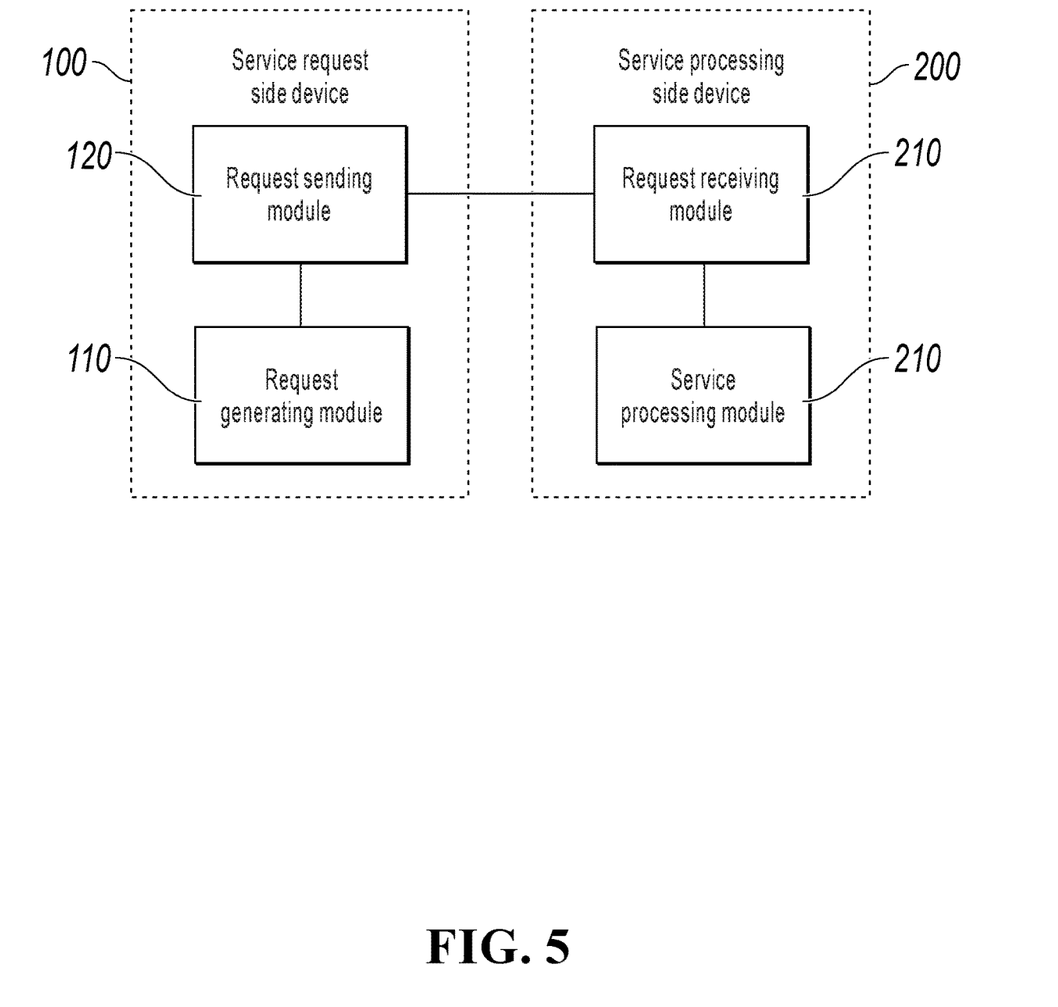
FIG. 5 is a schematic diagram illustrating a service processing system, according to the present application.

The present application further provides a service processing system. As shown in FIG. 5, the system can include a service request side device 100 and a service processing side device 200. For implementations of the two devices, references can be made to the previous implementations, and no repeated description is provided in the present application.

It can be learned from description of the implementations that, a person skilled in the art can clearly understand that the present application can be implemented by using software in addition to a necessary universal hardware platform. Based on such an understanding, the technical solutions in the present application essentially or the part contributing to the existing technology can be implemented in a form of a software product. The software product can be stored in a storage medium, such as a ROM/RAM, a magnetic disk, or an optical disc, and includes several instructions for instructing a computer device (a personal computer, a server, or a network device) to perform the methods described in the implementations or in some parts of the implementations of the present application.

The implementations in the present specification are described in a progressive way. For same or similar parts in the implementations, references can be made to each other. Each implementation focuses on a difference from other implementations. Particularly, a device or system implementation is similar to a method implementation, and therefore is described briefly. For related parts, references can be made to related descriptions in the method implementation. The described device or system implementations are merely examples. The modules described as separate parts can be physically separate or not. When the solutions in the present application are implemented, the functions of each module can be implemented in one or more pieces of software and/or hardware. Some or all of the modules can be selected based on an actual need to implement the solutions of the implementations. A person of ordinary skill in the art can understand and implement the implementations of the present application without creative efforts.

The previous descriptions are merely specific implementations of the present application. It is worthwhile to note that a person of ordinary skill in the art can make several improvements or polishing without departing from the principle of the present application. The improvements and polishing shall fall within the protection scope of the present application.

Figure 6:
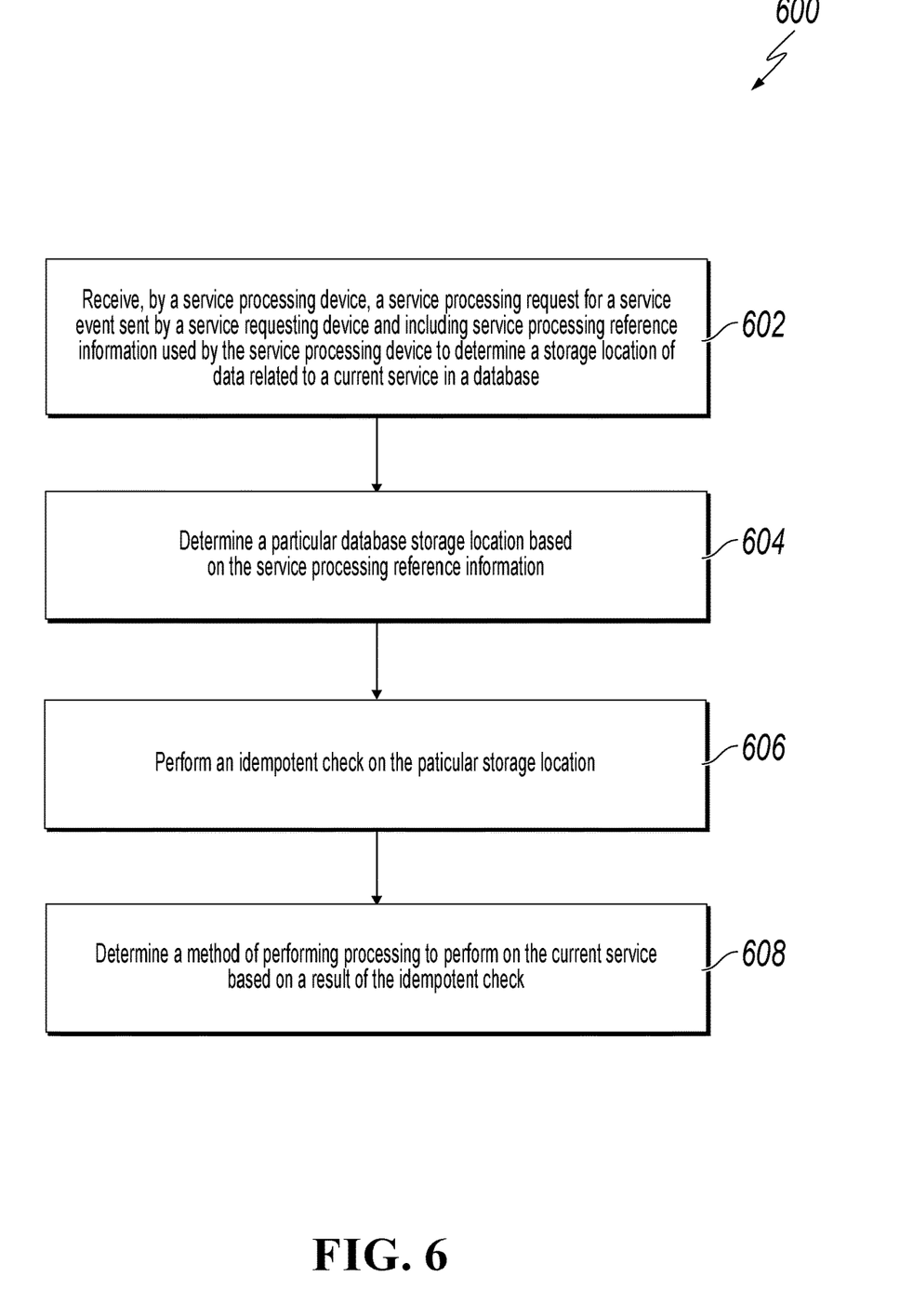
FIG. 6 is a flowchart illustrating an example of a computer-implemented method for a process of idempotent check, according to an implementation of the present disclosure.

FIG. 6 is a flowchart illustrating an example of a computer-implemented method 600 for a process of idempotent check, according to an implementation of the present disclosure. For clarity of presentation, the description that follows generally describes method 600 in the context of the other figures in this description. However, it will be understood that method 600 can be performed, for example, by any system, environment, software, and hardware, or a combination of systems, environments, software, and hardware, as appropriate. In some implementations, various steps of method 600 can be run in parallel, in combination, in loops, or in any order.

At 602, a service processing request sent by a service requesting device (for example, a mobile-computing device) is received by a service processing device (for example, a server). The service processing request includes service processing reference information, where the service processing reference information is used by the service processing device to determine a storage location of data related to a current service in a database. In some implementations, the service processing request is repeatedly sent for the same service event. In this case, the service processing request includes the service processing reference information. The service processing reference information can be time information, such as the time when the request was first generated or when the request was sent. In some implementations, the service processing information can be database mode information, where the database mode includes, but is not limited to, a normal mode and a failover mode. In some implementations, the service processing request that is included in the service processing reference information can include the time information, the database mode information, or both. From 602, method 600 proceeds to 604.

At 604, the service processing device determines a particular storage location based on the service processing reference information. In some implementations, each of the subsequent service processing requests that is received at the service processing device includes, but is not limited to, the time information, the database mode information, or both. Moreover, the service processing device can determine a time-dimension-data partitioned table corresponding to the time information based on the service processing information in the service processing request. In the case of database mode information, the service processing device can determine a database corresponding to the database mode information based on the service processing information in the service processing request. From 604, method 600 proceeds to 606.

At 606, the service processing device performs an idempotent check on the determined storage location. From 606, method 600 proceeds to 608.

At 608, the service processing device determines a method of processing to perform on the current service based on a result of the idempotent check. For example, if the identification information is successfully inserted, it can indicate that the service system is processing the service request for the first time, and to continue with a normal service processing procedure. If the identification information insertion fails, it can indicate that the service information already exists in the idempotent table (that is, the service system has previously processed the service request). In this case, the request can be determined to be a repeat request and processing can cease. After 608, method 600 can stop.

Embodiments and the operations described in this specification can be implemented in digital electronic circuitry, or in computer software, firmware, or hardware, including the structures disclosed in this specification or in combinations of one or more of them. The operations can be implemented as operations performed by a data processing apparatus on data stored on one or more computer-readable storage devices or received from other sources. A data processing apparatus, computer, or computing device may encompass apparatus, devices, and machines for processing data, including by way of example a programmable processor, a computer, a system on a chip, or multiple ones, or combinations, of the foregoing. The apparatus can include special purpose logic circuitry, for example, a central processing unit (CPU), a field programmable gate array (FPGA) or an application-specific integrated circuit (ASIC). The apparatus can also include code that creates an execution environment for the computer program in question, for example, code that constitutes processor firmware, a protocol stack, a database management system, an operating system (for example an operating system or a combination of operating systems), a cross-platform runtime environment, a virtual machine, or a combination of one or more of them. The apparatus and execution environment can realize various different computing model infrastructures, such as web services, distributed computing and grid computing infrastructures.

A computer program (also known, for example, as a program, software, software application, software module, software unit, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A program can be stored in a portion of a file that holds other programs or data (for example, one or more scripts stored in a markup language document), in a single file dedicated to the program in question, or in multiple coordinated files (for example, files that store one or more modules, sub-programs, or portions of code). A computer program can be executed on one computer or on multiple computers that are located at one site or distributed across multiple sites and interconnected by a communication network.

Processors for execution of a computer program include, by way of example, both general- and special-purpose microprocessors, and any one or more processors of any kind of digital computer. Generally, a processor will receive instructions and data from a read-only memory or a random-access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data. A computer can be embedded in another device, for example, a mobile device, a personal digital assistant (PDA), a game console, a Global Positioning System (GPS) receiver, or a portable storage device. Devices suitable for storing computer program instructions and data include non-volatile memory, media and memory devices, including, by way of example, semiconductor memory devices, magnetic disks, and magneto-optical disks. The processor and the memory can be supplemented by, or incorporated in, special-purpose logic circuitry.

Mobile devices can include handsets, user equipment (UE), mobile telephones (for example, smartphones), tablets, wearable devices (for example, smart watches and smart eyeglasses), implanted devices within the human body (for example, biosensors, cochlear implants), or other types of mobile devices. The mobile devices can communicate wirelessly (for example, using radio frequency (RF) signals) to various communication networks (described below). The mobile devices can include sensors for determining characteristics of the mobile device's current environment. The sensors can include cameras, microphones, proximity sensors, GPS sensors, motion sensors, accelerometers, ambient light sensors, moisture sensors, gyroscopes, compasses, barometers, fingerprint sensors, facial recognition systems, RF sensors (for example, Wi-Fi and cellular radios), thermal sensors, or other types of sensors. For example, the cameras can include a forward- or rear-facing camera with movable or fixed lenses, a flash, an image sensor, and an image processor. The camera can be a megapixel camera capable of capturing details for facial and/or iris recognition. The camera along with a data processor and authentication information stored in memory or accessed remotely can form a facial recognition system. The facial recognition system or one-or-more sensors, for example, microphones, motion sensors, accelerometers, GPS sensors, or RF sensors, can be used for user authentication.

To provide for interaction with a user, embodiments can be implemented on a computer having a display device and an input device, for example, a liquid crystal display (LCD) or organic light-emitting diode (OLED)/virtual-reality (VR)/augmented-reality (AR) display for displaying information to the user and a touchscreen, keyboard, and a pointing device by which the user can provide input to the computer. Other kinds of devices can be used to provide for interaction with a user as well; for example, feedback provided to the user can be any form of sensory feedback, for example, visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments can be implemented using computing devices interconnected by any form or medium of wireline or wireless digital data communication (or combination thereof), for example, a communication network. Examples of interconnected devices are a client and a server generally remote from each other that typically interact through a communication network. A client, for example, a mobile device, can carry out transactions itself, with a server, or through a server, for example, performing buy, sell, pay, give, send, or loan transactions, or authorizing the same. Such transactions may be in real time such that an action and a response are temporally proximate; for example an individual perceives the action and the response occurring substantially simultaneously, the time difference for a response following the individual's action is less than 1 millisecond (ms) or less than 1 second (s), or the response is without intentional delay taking into account processing limitations of the system.

Examples of communication networks include a local area network (LAN), a radio access network (RAN), a metropolitan area network (MAN), and a wide area network (WAN). The communication network can include all or a portion of the Internet, another communication network, or a combination of communication networks. Information can be transmitted on the communication network according to various protocols and standards, including Long Term Evolution (LTE), 5G, IEEE 802, Internet Protocol (IP), or other protocols or combinations of protocols. The communication network can transmit voice, video, biometric, or authentication data, or other information between the connected computing devices.

Features described as separate implementations may be implemented, in combination, in a single implementation, while features described as a single implementation may be implemented in multiple implementations, separately, or in any suitable sub-combination. Operations described and claimed in a particular order should not be understood as requiring that the particular order, nor that all illustrated operations must be performed (some operations can be optional). As appropriate, multitasking or parallel-processing (or a combination of multitasking and parallel-processing) can be performed.

What is claimed is:

1. A computer-implemented method, comprising:
   providing, by a service processing device to a service requesting device, prior to receiving a service processing request for a service event, database running mode information used by the service processing device for processing service events;
   receiving, by the service processing device, a first service processing request for a service event sent by the service requesting device, wherein the first service processing request comprises service processing reference information, wherein the service processing reference information comprises a particular time when the first service processing request was initiated by the service requesting device and the database running mode information used by the service processing device, wherein the service processing reference information is used by the service processing device to determine one of a plurality of databases and a first storage location in the one of the plurality of databases for performing idempotent check of the first service processing request, wherein the one of the plurality of databases is partitioned into a plurality of storage locations, wherein each storage location of the plurality of storage locations is associated with a corresponding range of time and a corresponding idempotent table, and wherein two corresponding ranges of time of any two storage locations of the plurality of storage locations do not overlap;
   determining, by the service processing device, the first storage location based on the service processing reference information, comprising determining that the particular time in the service processing reference information is within a particular range of time associated with the first storage location;
   performing, by the service processing device, based on a particular idempotent table associated with the first storage location, a first idempotent check on the first storage location, and updating the particular idempotent table associated with the first storage location after the first idempotent check to include unique transaction identification information of the first service processing request comprising a service request transaction number and a service request source;

determining, by the service processing device, a method of processing to perform on the service event based on a result of the first idempotent check;

receiving, by the service processing device, a second service processing request that is sent for the service event, wherein the second service processing request comprises the service processing reference information in the first service processing request;

determining the first storage location in the one of the plurality of databases for performing idempotent check of the second service processing request based on the service processing reference information, comprising determining that the particular time in the service processing reference information is within the particular range of time associated with the first storage location;

performing, by the service processing device, based on the updated particular idempotent table associated with the first storage location, a second idempotent check; and rejecting, by the service processing device, the second service processing request based on a result of the second idempotent check.

2. The computer-implemented method of claim 1, wherein each subsequent service processing request that is received by the service processing device, comprises the service processing reference information in the first service processing request.

3. The computer-implemented method of claim 1, wherein the database running mode information comprises a normal mode and a failover mode.

4. The computer-implemented method of claim 3, wherein the one of the plurality of databases corresponds to the database running mode information based on the service processing reference information in the first service processing request.

5. A non-transitory, computer-readable medium storing one or more instructions executable by a computer system to perform operations comprising:

providing, by a service processing device to a service requesting device, prior to receiving a service processing request for a service event, database running mode information used by the service processing device for processing service events;

receiving, by the service processing device, a first service processing request for a service event sent by the service requesting device, wherein the first service processing request comprises service processing reference information, wherein the service processing reference information comprises a particular time when the first service processing request was initiated by the service requesting device and the database running mode information used by the service processing device, wherein the service processing reference information is used by the service processing device to determine one of a plurality of databases and a first storage location in the one of the plurality of databases for performing idempotent check of the first service processing request, wherein the one of the plurality of databases is partitioned into a plurality of storage locations, wherein each storage location of the plurality of storage locations is associated with a corresponding range of time and a corresponding idempotent table, and wherein two corresponding ranges of time of any two storage locations of the plurality of storage locations do not overlap;

determining, by the service processing device, the first storage location based on the service processing reference information, comprising determining that the particular time in the service processing reference information is within a particular range of time associated with the first storage location;

performing, by the service processing device, based on a particular idempotent table associated with the first storage location, a first idempotent check on the first storage location, and updating the particular idempotent table associated with the first storage location after the first idempotent check to include unique transaction identification information of the first service processing request comprising a service request transaction number and a service request source;

determining, by the service processing device, a method of processing to perform on the service event based on a result of the first idempotent check;

receiving, by the service processing device, a second service processing request that is sent for the service event, wherein the second service processing request comprises the service processing reference information in the first service processing request;

determining the first storage location in the one of the plurality of databases for performing idempotent check of the second service processing request based on the service processing reference information, comprising determining that the particular time in the service processing reference information is within the particular range of time associated with the first storage location;

performing, by the service processing device, based on the updated particular idempotent table associated with the first storage location, a second idempotent check; and rejecting, by the service processing device, the second service processing request based on a result of the second idempotent check.

6. The non-transitory, computer-readable medium of claim 5, wherein each subsequent service processing request that is received by the service processing device, comprises the service processing reference information in the first service processing request.

7. The non-transitory, computer-readable medium of claim 5, wherein the database running mode information comprises a normal mode and a failover mode.

8. The non-transitory, computer-readable medium of claim 7, wherein the one of the plurality of databases corresponds to the database running mode information based on the service processing reference information in the first service processing request.

9. A computer-implemented system, comprising:

one or more computers; and one or more computer memory devices interoperably coupled with the one or more computers and having tangible, non-transitory, machine-readable media storing one or more instructions that, when executed by the one or more computers, perform one or more operations comprising:

providing, by a service processing device to a service requesting device, prior to receiving a service processing request for a service event, database running mode information used by the service processing device for processing service events;

receiving, by the service processing device, a first service processing request for a service event sent by the service requesting device, wherein the first service processing request comprises service processing reference information, wherein the service processing reference information comprises a particular time when the first service processing request was initiated by the service requesting device and the database running mode information used by the service processing device, wherein the service processing reference information is used by the service processing device to determine one of a plurality of databases and a first storage location in the one of the plurality of databases for performing idempotent check of the first service processing request, wherein the one of the plurality of databases is partitioned into a plurality of storage locations, wherein each storage location of the plurality of storage locations is associated with a corresponding range of time and a corresponding idempotent table, and wherein two corresponding ranges of time of any two storage locations of the plurality of storage locations do not overlap;

determining, by the service processing device, the first storage location based on the service processing reference information, comprising determining that the particular time in the service processing reference information is within a particular range of time associated with the first storage location;

performing, by the service processing device, based on a particular idempotent table associated with the first storage location, a first idempotent check on the first storage location, and updating the particular idempotent table associated with the first storage location after the first idempotent check to include unique transaction identification information of the first service processing request comprising a service request transaction number and a service request source;

determining, by the service processing device, a method of processing to perform on the service event based on a result of the first idempotent check;

receiving, by the service processing device, a second service processing request that is sent for the service event, wherein the second service processing request comprises the service processing reference information in the first service processing request;

determining the first storage location in the one of the plurality of databases for performing idempotent check of the second service processing request based on the service processing reference information, comprising determining that the particular time in the service processing reference information is within the particular range of time associated with the first storage location;

performing, by the service processing device, based on the updated particular idempotent table associated with the first storage location, a second idempotent check; and rejecting, by the service processing device, the second service processing request based on a result of the second idempotent check.

10. The computer-implemented system of claim 9, wherein each subsequent service processing request that is received by the service processing device, comprises the service processing reference information in the first service processing request.

11. The computer-implemented system of claim 9, wherein the database running mode information comprises a normal mode and a failover mode.

12. The computer-implemented system of claim 11, wherein the one of the plurality of databases corresponds to the database running mode information based on the service processing reference information in the first service processing request.

* * * * *